Jan. 26, 1971 R. EVANS 3,558,282
POLYMERISATION APPARATUS
Filed Nov. 20, 1967 2 Sheets-Sheet 1

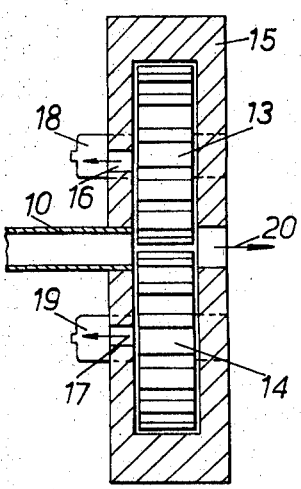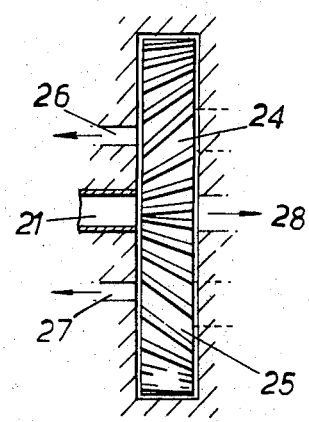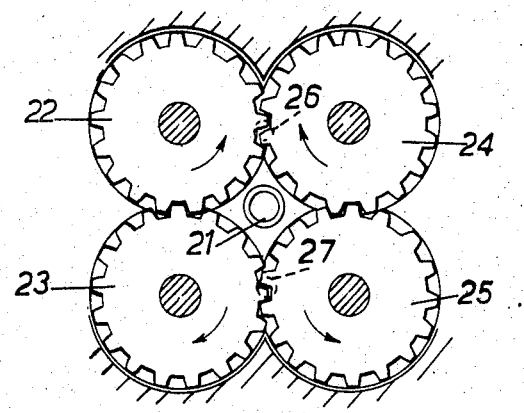

United States Patent Office 3,558,282
Patented Jan. 26, 1971

3,558,282
POLYMERISATION APPARATUS
Ronald Evans, Pontypool, England, assignor to Imperial Chemical Industries Limited, London, England, a corporation of Great Britain
Filed Nov. 20, 1967, Ser. No. 684,220
Claims priority, application Great Britain, Nov. 30, 1966, 53,570/66
Int. Cl. B01d 19/00
U.S. Cl. 23—285                                  2 Claims

ABSTRACT OF THE DISCLOSURE

Separator for molten polymer flowing in two phase annular flow with a higher velocity gas including at least one orifice and separate means to establish a pressure gradient in the area of the orifice.

This invention relates to new and improved polymerisation apparatus for the continuous manufacture of high molecular weight polymeric fibre forming materials and more particularly to a separator for piped streams of molten polyamide associated with steam.

In the manufacture of polyamides by a continuous process it not infrequently happens that the high molecular weight polyamide is obtained in molten form associated with steam, and it is necessary to separate the latter from the polyamide as they issue from the pipe. The steam may have arisen from moisture originally contained in the monomer starting materials, or it may have been chemically evolved in the polymerisation reaction, or it could have been introduced as a non-oxidising gaseous medium. It is to be understood that the steam commonly emerges from the pipe at high velocity. It is possible to conduct the polyamide and steam into a heated vented vessel, in the bottom of which the molten polyamide collects, to be removed as required, whilst the steam escapes by the vent. In practice, however, owing to the velocity with which the steam issues from the open end of the pipe, some of the polyamide is inevitably spattered on to the walls of the vessel, which become covered with a film thereof. Although it would be expected that this polyamide film, being above its melting point, would constantly run down into the polyamide pool below, parts of it at least accumulate for a sufficient time to produce an undesirable degree of degradation in the polyamide.

Various devices in the form of modified ends to the pipe have been proposed without affording a satisfactory solution to the problem of resolving the outflow into steam on the one hand and a quietly flowing stream of polyamide on the other.

This invention is based on the fact that the polyamide and steam move through the pipe in what is known as two-phase annular flow, by which is meant that the rather viscous molten polyamide flows along the inner surface of the pipe, constituting a cross-sectional annulus, while the steam passes down the centre (at a much greater linear velocity than the polyamide). It has now been found possible to remove the molten polyamide from the pipe or conduit by providing at least one orifice therein and establishing locally, i.e. in the neighbourhood of the orifice, a pressure gradient causing the polyamide to flow out of the conduit. The orifice or orifices may be arranged in various ways. The pressure gradient can be produced by reducing the external pressure or increasing (locally) the internal pressure. In the latter case mechanical means can be used to urge the polyamide towards the orifice; this results, owing to the viscosity of the polyamide, in an increase of pressure at the orifice. Preferably the orifices are situated at or near the end of the conduit or pipe.

Accordingly the invention relates to a separator for molten polymeric fibre forming material flowing, in association with steam or other gas, in a conduit in continuous polymerisation apparatus, which separator comprises at least one orifice in said conduit together with means for increasing the internal pressure and/or decreasing the external pressure in the neighborhood of said orifice so as to establish a pressure gradient through the orifice causing the polymeric material to flow out of the conduit.

The separator is maintained at a temperature above the melting point of the polyamide by conventional means, e.g. jackets heated electrically or by a vapour of diphenyl and diphenyl oxide.

There will now be described, by way of example, convenient embodiments of the invention, this description referring to the drawings, filed with the provisional specification. Although the embodiments are described with reference to polyamides, they could be employed for piped streams of other liquids and gases having similar physical properties to those of molten polyamides and steam and behaving in a similar manner.

The diagrammatic drawings accompanying the provisional specification illustrate the following forms of separator.

FIG. 4 is a side view of separator in FIG. 3.

FIG. 5 is a separator with helical gears to locally increase the pressure.

FIG. 6 is a cross-section view of separator in FIG. 5.

Figure 1:
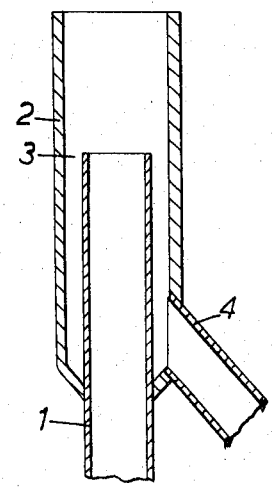
FIG. 1 is a separator with concentric orifice using reduced external pressure.
Figure 2:
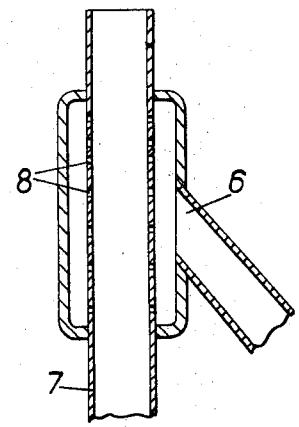
FIG. 2 is a separator with peripheral orifices using reduced external pressure.

In FIG. 1 the polyamide and steam flow up the conduit 1, which leads into a slightly wider conduit 2, the concentric orifice or gap 3 therebetween being subjected to a reduced pressure by pumping means (not shown) connected to the side tube 4. As the molten polyamide reaches the end of conduit 1, it wells over the edge into the concentric orifice 3, whence it is withdrawn through the side tube 4. The steam proceeds straight on as shown by the arrow 5.

Figure 3:
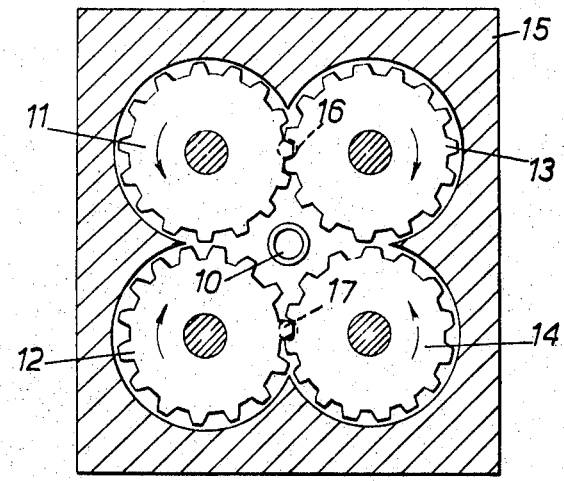
FIG. 3 is a cross-section view of separator in which the internal pressure is locally increased with gear wheels.

In the separator of FIG. 3 the molten polyamide emerges from the end of the conduit 10, between the teeth of four gear wheels 11, 12, 13, 14 which are mounted in the hatched housing 15 and revolve in the direction of the arrows. It will be observed that the teeth of wheels 11 and 13 are meshed at 16, as also the teeth of wheels 12 and 14 at 17. Behind the intermeshing teeth (as viewed) at 16 and 17 orifices are provided in the housing 15. The molten polyamides is urged towards these orifices by the teeth of the revolving wheels and, by reason of the local increase in internal pressure, caused to emerge therefrom. The steam proceeds on its way. FIG. 4 is similarly numbered, arrows 18 and 19 indicating the emerging polyamide whilst arrow 20 shows the issuing steam.

A somewhat similar arrangement of gear wheels is illustrated in FIGS. 5 and 6 but in this case the gears are helical and all of them mesh together. Each gear wheel has 17 teeth, a helix angle of 45° and a pitch circle diameter of 6 cm. 21 is the conduit and 22, 23, 24, 25 and gear wheels, which rotate as shown by the arrows, and are mounted in a casing indicating by hatching in FIG. 5. The moving teeth of the gear wheels impel the molten polyamide emerging from the conduit 21 towards the two outlets 26, 27 through which it leaves the separator. The steam rushes out as indicated by the arrow 28.

I claim:
1. A separator for molten polymeric fiber-forming material flowing in two phase annular flow in association with a gas flowing at a higher velocity than said fiber-forming material which comprises a housing having interior side walls; a plurality of rotatable intermeshing gear wheels positioned within said housing to form a centrally positioned open space surrounded laterally by said intermeshing gear wheels, said open space remaining unconfined during the operation of said separator to allow the uninterrupted flow of said gas therethrough; conduit means positioned behind said gear wheels leading to said space and arranged to convey said polymer and gas into said space and between the teeth of said gear wheels; a plurality of polymer exit orifices positioned in said housing behind said gear wheels, said gear wheels arranged to intermesh and force said polymer toward said exits, said gear wheels rotating in close proximity to the interior side walls of said housing to prevent said polymer from flowing past said gear wheels, and a gas exit positioned in front of said gear wheels in said housing axially aligned with said enclosed space through which said gas exits.

2. The apparatus of claim 1 wherein said gear wheels have helical teeth.

References Cited

UNITED STATES PATENTS

| | | | |
|---|---|---|---|
| 1,754,722 | 4/1930 | Lucke | 55—190X |
| 2,782,843 | 2/1957 | Rodenacker | 159—11 |
| 2,796,240 | 6/1957 | Miller | 259—6 |
| 3,134,655 | 5/1964 | Boucher | 55—199X |
| 3,208,829 | 9/1965 | Terenzi | 23—252 |
| 3,241,296 | 3/1966 | Ramsey | 55—199 |
| 3,177,127 | 4/1965 | Longstreth | 202—205X |

JAMES H. TAYMAN, Jr., Primary Examiner

U.S. Cl. X.R.

23—252; 159—11, 4; 55—52, 199, 407, 474; 259—6; 264—102